United States Patent [19]

Keim et al.

[11] Patent Number: 5,525,566
[45] Date of Patent: Jun. 11, 1996

[54] PALLADIUM PHOSPHINE LIGAND CATALYST

[75] Inventors: Wilhelm Keim; Stefan Mecking, both of Aachen, Germany

[73] Assignee: BP Chemicals Limited, London, United Kingdom

[21] Appl. No.: 218,518

[22] Filed: Mar. 25, 1994

[30] Foreign Application Priority Data

Mar. 26, 1993 [GB] United Kingdom ............... 306366

[51] Int. Cl.⁶ ............... B01J 31/00; B01J 31/24
[52] U.S. Cl. ............... 502/162; 502/170; 502/213
[58] Field of Search ............... 502/213, 162, 502/170

[56] References Cited

U.S. PATENT DOCUMENTS

| | | |
|---|---|---|
| 3,694,412 | 9/1972 | Noxald . |
| 4,415,500 | 11/1983 | Manassen et al. . |
| 4,472,526 | 9/1984 | Cornils et al. ............... 502/162 |
| 4,889,949 | 12/1989 | Grenquillet et al. ............... 502/162 |

FOREIGN PATENT DOCUMENTS

| | | |
|---|---|---|
| 0061337 | 3/1982 | European Pat. Off. . |
| 121965 | 3/1984 | European Pat. Off. . |
| 181014 | 9/1985 | European Pat. Off. . |
| 222454 | 11/1986 | European Pat. Off. . |
| 0516238 | 5/1992 | European Pat. Off. . |
| 2093474 | 5/1971 | France . |
| 1350822 | 5/1971 | United Kingdom . |

*Primary Examiner*—Asok Pal
*Attorney, Agent, or Firm*—Fay, Sharpe, Beall, Fagan, Minnich & McKee

[57] ABSTRACT

There is disclosed a catalyst composition prepared by reacting together:

(a) a source of a Group VIII metal, (b) a compound of the formula (I)

$$R^1R^2PR^4CO_2R^3 \qquad (I)$$

where $R^1$ and $R^2$ are independently an unsubstituted or substituted alkyl, cycloalkyl or aryl group, $R^3$ is hydrogen, an unsubstituted or substituted alkyl, cycloalkyl or aryl group and $R^4$ is a divalent organic group and (c) a source of an anion which is either non-coordinating or weakly-coordinating to the Group VIII metal.

The catalyst compositions are used in the preparation of polyketones from carbon monoxide and one or more olefins. Novel compounds of the formula $[(\eta^3\text{-allyl})Pd(R^1R^2PR^4CO_2R^3)]Y$ where Y is a weakly or non-coordinating anion are useful as such catalysts.

6 Claims, No Drawings

PALLADIUM PHOSPHINE LIGAND CATALYST

BACKGROUND OF THE INVENTION

1. Field of the Invention

The present invention relates to catalyst compositions and to processes for preparing interpolymers of olefins and carbon monoxide by polymerising a mixture of one or more olefins and carbon monoxide in the presence of such catalyst compositions. In particular, the present invention relates to novel compounds and their use as catalysts in such processes.

2. Description of the Related Art

The preparation of linear alternating interpolymers of olefins and carbon monoxide having the formula:

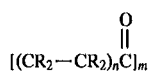

where the R groups are independently hydrogen or hydrocarbyl groups, n is at least 1 and m is a large integer, is known from U.S. Pat. No. 3,694,412. Such linear alternating interpolymers, which hereafter will be called polyketones, are prepared according to U.S. Pat. No. 3,694,412 by polymerising a mixture of one or more olefins and carbon monoxide in the presence of an aryl phosphine complex of a palladium halide and an inert solvent. However, the processes described in U.S. Pat. No. 3,694,412 are slow even at elevated temperature and pressure.

An improved version of the process described in U.S. Pat. No. 3,694,412 is described in European patent applications 181014 and 121965. It was subsequently found that the rate of the polymerisation process could be increased considerably by using a palladium catalyst with inter alia a bidentate phosphine and the anion of a carboxylic acid having a pKa of lower than 2 (as measured in aqueous solution). Examples of anions which can be used include trichloroacetate, dichloroacetate, tetrafluoroborate, hexafluorophosphate and p-toluene sulphonate, such anions being respectively the conjugate anions of trichloroacetic acid (pKa 0.70), dichloroacetic acid (pKa= 1.48), tetrafluoroboric acid, hexafluorophosphoric acid and p-toluenesulphonic acid.

More recently EP 222454 suggests that any acid having a pKa of less than 5 (determined in aqueous solution at 18° C.) can be used.

SUMMARY OF THE INVENTION

It has now been found that instead of using a bidentate diphosphine as described in EP 121965, catalyst systems, in particular palladium catalyst systems, for the production of polyketones based upon carboxylic acid substituted phosphine ligands can be employed.

According to the present invention there is provided a catalyst composition prepared by reacting together:

(a) a source of a Group VIII metal,
(b) a compound of the formula (I)

$$R^1R^2PR^4CO_2R^3 \qquad (I)$$

where $R^1$ and $R^2$ are independently an unsubstituted or substituted alkyl, cycloalkyl or aryl group, $R^3$ is hydrogen, an unsubstituted or substituted alkyl, cycloalkyl or aryl group and $R^4$ is a divalent organic group and (c) a source of an anion which is either non-coordinating or weakly-coordinating to the Group VIII metal.

The present invention further provides a process for preparing polyketones by polymerising a mixture of carbon monoxide and one or more olefins in the presence of a catalyst composition as defined thereinabove.

The term polyketone is used herein to mean an interpolymer of one or more olefins with carbon monoxide. The idealised structure of such a material would comprise a one, two or three dimensional network of strictly alternating olefin and carbon monoxide units. Although polyketones prepared according to the present invention correspond to this idealised structure, it is envisaged that materials corresponding to this structure in the main but containing small regimes (i.e. up to 10 wt %) of the corresponding polyolefin also fall within the definition.

DESCRIPTION OF THE PREFERRED EMBODIMENT

The catalyst composition described above is itself prepared by reacting together (a) a source of a Group VIII metal, (b) a compound having the formula (I) defined above, and (c) a source of an anion which is non-coordinating or weakly coordinating to the Group VIII metal.

As regards component (a), this is a Group VIII metal; the Group VIII metals are iron, cobalt, nickel, ruthenium, rhodium, palladium, osmium, iridium and platinum. The second-row Group VIII metals (i.e. ruthenium, rhodium, palladium) are preferred; particularly preferred is palladium.

Component (b) is a compound of formula I $$R^1R^2PR^4CO_2R^3 \qquad (I)$$

where $R^1$ and $R^2$ are independently an unsubstituted or substituted alkyl, cycloalkyl or aryl group, preferably an aryl group, e.g. phenyl or ortho anisyl, $R^3$ is hydrogen, an unsubstituted or substituted alkyl, cycloalkyl or aryl group, preferably hydrogen, methyl or ethyl; $R^4$ is a divalent organic group, for example, $-(CR^5R^6)_n-$ to where $R^5$ and $R^6$ are independently a hydrogen or a $C_1$–$C_6$ alkyl group and each of the $CR^5R^6$ groups can be the same or different and n is an integer from 1 to 6; however it is preferred that $R^5$ and $R^6$ are each hydrogen and n is an integer from 1 to 6, preferably 1 to 3, more preferably n is 2. $R^4$ can also be an aromatic group e.g. $C_6H_4$ (phenyl) or $C_{10}H_{12}$ (naphthyl) preferably connected through adjacent atoms.

As regards component (c), this is a source of an anion which is either non-coordinating or weakly coordinating. Such anions are suitably the conjugate bases of strong acids having e.g. a pKa of less than 6 preferably less than 2 (e.g. $HBF_4$, $HPF_6$, $HSbF_6$, paratoluene sulphonic acid).

Where the Group VIII metal is palladium, the source of palladium can include simple inorganic and organic salts, e.g. halides, nitrates, carboxylates and the like as well as organometallic and coordination complexes, a preferred complex is bis($\eta^3$-allyl) palladium. In some cases, by suitable choice of coordination complex, it may be possible to add the palladium and the compound of formula I as a single entity.

For example, the novel compounds of formula II $$[(\eta^3\text{allyl})Pd(R^1R^2PR^4CO_2R^3)]Y \qquad II$$

can be used as catalysts for the polymerisation reaction; $R^1$, $R^2$, $R^3$, and $R^4$ in formula II all have the same meaning as given hereinabove; Y is an anion which is non-coordinating or weakly coordinating to palladium. In a further aspect of the present invention there are provided compounds of formula II as defined above.

In addition, the catalysts for the reaction can be generated from a single discrete Group VIII metal compound of a ligand which is a compound of formula I, and a source of an anion which is non-coordinating or weakly coordinating to the Group VIII metal (e.g. an acid or a salt). Novel compounds of formula III $$(\eta^3 \text{allyl})Pd(R^1R^2PR^4CO_2) \qquad \text{(III)}$$

can be used in this way. $R^1$, $R^2$, and $R^4$ in formula III have the same meaning as given hereinabove. The source of the non-coordinating or weakly coordinating anion can be a salt or an acid, preferably an acid. It is a further aspect of the present invention that there are provided compounds of formula III as defined hereinabove.

On the other hand, it is possible to generate the catalyst in situ. Although any source of the Group VIII metal can be used, it may be necessary, when a metal complex having strongly coordinating ligands is employed, to ensure that such ligands are removed. An example of such a complex is palladium acetate where the acetate anions bind strongly to the palladium. In such cases the acetate anions can be removed by adding component (c) above as its conjugate acid since such a conjugate acid will protonate the acetate anions and cause their removal.

Another approach which is useful when metal halides e.g. palladium halides are employed (halide anions also bind strongly to the palladium) is to use a thallium or silver salt of component (c). In such cases a metathesis reaction occurs and the insoluble silver or thallium halide precipitates and can be removed by filtration.

Considering next the feedstocks for the polymerisation reaction, it is believed that any source of carbon monoxide can be used. Thus the carbon monoxide may contain nitrogen, inert gases and up to 10% hydrogen.

Any olefin can in theory be used although the best reaction rates are obtained when either ethylene or a mixture of olefins e.g. ethylene/propylene and the like, is used. The lower rates obtained in the absence of ethylene should not be construed as indicating that the process can be used only with an ethylene feedstock since other olefins such as propylene, 4,methylpentene-1, styrene, acrylates, vinyl acetates and the like all undergo reaction to some extent. A preferred polyketone is a terpolymer of ethylene, propylene and carbon monoxide; under these circumstances the olefin will be a mixture of ethylene and propylene.

The polymerisation process is suitably carried out in a solvent which is chemically inert under the conditions employed and one in which the catalyst is soluble. Moreover, the solvent like the anion should be either weakly coordinating or non-coordinating. Examples of such solvents include alcohols, e.g. methanol, ethanol and propanol, ethers, glycols, glycol ethers and chlorinated solvents e.g. chloroform and dichloromethane. Preferred solvents are methanol, ethoxyethanol, chloroform or dichloromethane especially dichloromethane. Alternatively, an aliphatic tertiary alcohol can be used, preferably tertiary butanol. This can be used as a solvent on its own or in combination with an aprotic solvent, e.g. ketones. A preferred solvent system is tertiary butanol/acetone mixture.

The polymerisation process is suitably carried out at a temperature in the range 20° to 150° C. preferably 50° to 120° C. and at elevated pressure (e.g. 1 to 100 bars). The overpressure of gas is suitably carbon monoxide or carbon monoxide and olefin, if the olefin is gaseous under the reaction conditions. It is possible to operate the polymerisation process either batchwise or continuously.

EXAMPLES

1. Preparation of the Compounds $(\eta^3\text{-allyl})Pd(PPh_2(CH_2)_nCO_2)$

A solution of 1 eq of ω-diphenylphosphino carboxylic acid $(Ph_2P(CH_2)_nCO_2H; n=1,2,3)$ in $CH_2Cl_2$ (5 ml) is added to a suspension of $Pd(\eta^3\text{-allyl})_2$ (2 mmol) in $CH_2Cl_2$ (5 ml) at −78° C. After stirring for 1 hr at −78° C. and for a further 3 hr at −30° C. the solvent is evaporated at this temperature.

The remaining residue is dissolved in $CH_2Cl_2$ (5 ml) at room temperature and precipitated by addition of pentane (20 ml). By filtration and drying at 0.02 mbar the product is obtained as a white solid in about 85% yield. These compounds where n=1,2 and 3 are designated A, B and C respectively.

2. Preparation of the Compounds $[(\eta^3\text{-allyl})Pd(PPh_2(CH_2)_nCO_2R^3)]Y$ (n=1,2,3; $R^3$=H, Me, Et, $^tBu$; Y=$BF_4$, $SbF_6$, $PF_6$)

A solution of 1 eq of $Ph_2P(CH_2)_nCO_2R^3$ in $CH_2Cl_2$ (10 ml) is added to a solution of $[Pd(\eta^3\text{-allyl})X]_2$ (2 mmol) in $CH_2Cl_2$ (10 ml). After stirring for 30 min the solution is added to 1.02 eq of AgY; AgX precipitates immediately. The slurry is stirred for 5 mins and then filtered over celite. The filtrate is cooled to −20° C. and the solvent is removed in vacuo. The product is obtained as a light-yellow solid, which is stored at −20° C. Compounds D to N were prepared in this way (see Table 1).

TABLE 1

| Compound | n | $R^3$ | X | Y |
|---|---|---|---|---|
| D | 1 | H | Cl | $BF_4$ |
| E | 1 | Me | Cl | $BF_4$ |
| F | 1 | $^tBu$ | Cl | $BF_4$ |
| G | 1 | $^tBu$ | Cl | $SbF_6$ |
| H | 2 | H | Cl | $BF_4$ |
| I | 2 | H | Cl | $PF_6$ |
| J | 2 | Me | Cl | $BF_4$ |
| K | 2 | Et | Cl | $BF_4$ |
| L | 2 | Et | I | $PF_6$ |
| M | 2 | Et | I | $SbF_6$ |
| N | 3 | Et | I | $BF_4$ |

Polymerisation of CO and Ethylene

Carbon monoxide and ethylene were polymerised using a selection of the above described compounds as catalysts as follows:

A solution of the appropriate compound in dichloromethane was transferred under argon to a steel autoclave by means of a syringe. The autoclave was then pressurised with ethylene and subsequently CO and heated in an oil bath. In all cases insoluble polyketone or soluble oligoketones or both were produced and the results are detailed in Table 2.

TABLE 2

Reaction conditions and results of Catalytic Experiments with Ethylene and Carbon Monoxide

| Catalyst | n (Cat.)/ mmol | Temp. | Pressure/bar $C_2H_4$ | CO | CO-Conversion[a] | TON for insol. PK | TON for soluble Oligomers[a] | TON total[a] | MP. PK |
|---|---|---|---|---|---|---|---|---|---|
| E | 0.095 | RT | 34 | 5 | 8% | 29 | -- | 29 | >250° C. |
| E | 0.106 | 50° C. | 31 | 5 | (75%) | 9 | (192) | (201) | 180-182° C. |
| B | 0.067 | 80° C. | 37 | 10 | 0.4% | 4 | -- | 4 | -- |
| B + HBF$_4$[b] | 0.052 | 50° C. | 36 | 10 | 34% | 421 | -- | 421 | >250° C. |
| H | 0.129 | 50° C. | 32 | 10 | 44% | 223 | -- | 223 | 210-215° C. |
| J | 0.030 | 50° C. | 31 | 5 | 21% | 202 | -- | 202 | 225-230° C. |
| J | 0.033 | 80° C. | 32 | 5 | 18% | 195 | -- | 195 | 200-205° C. |
| K | 0.096 | 50° C. | 36 | 10 | 20% | 118 | -- | 118 | 228-235° C. |
| L | 0.190 | 50° C. | 35 | 5 | (100%) | 114 | (94) | (208) | 200-210° C. |
| L | 0.046 | 50° C. | 33 | 5 | 32% | 244 | -- | 244 | 239-242° C. |
| L | 0.101 | 50° C. | 34 | 15 | 13% | 120 | -- | 120 | 240-242° C. |
| M | 0.091 | 50° C. | 35 | 5 | (70%) | 244 | (85) | (329) | 187-195° C. |
| M | 0.100 | 50° C. | 35 | 10 | (79%) | 490 | (19) | (509) | 195-204° C. |
| N | 0.145 | RT | 35 | 5 | (56%) | 111 | (27) | (138) | 180-182° C. |
| N | 0.182 | 50° C. | 32 | 5 | (65%) | -- | (128) | (128) | -- |

[a]: yields of soluble oligomers were calculated from the gas chromatograms assuming correction factors of $K_f = 1$. This is a very inaccurate method, but to show up trends and to indicate the order of magnitude of the amounts of products formed, the results are given in parenthesis.
[b]: four equivalents of a 54% solution of HBF4 in ether.
TON = Turnover Number.

We claim:

1. A catalyst composition prepared by reacting together
   (a) a source of palladium metal,
   (b) a compound of the formula (I)

$$R^1R^2PR^4CO_2R^3 \qquad (I)$$

where $R^1$ and $R^2$ are independently an unsubstituted or substituted alkyl, cycloalkyl or aryl group, $R^3$ is hydrogen, an unsubstituted or substituted alkyl, cycloalkyl or aryl group and $R^4$ is a divalent organic group, and
   (c) a source of an anion which is either non-coordinating or weakly-coordinating to the Group VIII metal.
2. A catalyst composition as claimed in claim 1 wherein $R^1$ and $R^2$ are independently an unsubstituted or substituted aryl group.
3. A catalyst composition as claimed in claim 2 wherein $R^1$ and $R^2$ are independently an unsubstituted or substituted phenyl group.
4. A catalyst composition as claimed in claim 1 wherein $R^3$ is hydrogen, methyl or ethyl.
5. A catalyst composition as claimed in claim 1 wherein $R^4$ is a group of the formula —$(CH_2)_n$— where n is an integer from 1 to 6.
6. A catalyst composition as claimed in claim 1 wherein $R^4$ is a phenyl group connected through adjacent atoms.

* * * * *